Dec. 15, 1942. R. R. WEST Re. 22,234

FILING DRAWER

Original Filed Aug. 22, 1939 2 Sheets-Sheet 1

INVENTOR.
Ross R. West.

BY
Chas. E. Townsend.
ATTORNEY.

Dec. 15, 1942. R. R. WEST Re. 22,234

FILING DRAWER

Original Filed Aug. 22, 1939 2 Sheets-Sheet 2

INVENTOR.
Ross R. West.
BY
Chas. E. Townsend.
ATTORNEY.

Reissued Dec. 15, 1942 Re. 22,234

UNITED STATES PATENT OFFICE 22,234

FILING DRAWER

Ross R. West, San Francisco, Calif., assignor to M. G. West Company, San Francisco, Calif., a corporation of California Original No. 2,238,088, dated April 15, 1941, Serial No. 291,359, August 22, 1939. Application for reissue June 20, 1941, Serial No. 398,997

9 Claims. (Cl. 129—28)

This invention relates to filing drawers and particularly to a compression plate which is adjustable longitudinally of the drawer, the present invention being an improved or modified form of the invention disclosed in my co-pending application entitled "Filing drawer," filed August 22, 1939, Serial No. 291,358, since matured into Patent No. 2,272,537, dated February 10, 1942.

In the co-pending application referred to, a compressor plate is disclosed which is pivoted to the bottom of the drawer and at the rear end thereof. The compressor plate is actuated by a pair of sliding bars disposed one in each side of the drawer by being connected with said bars through means of a cross-bar. These sliding bars, together with the pivoted compressor plate, cause compression of the files within the drawer due to spring pressure exerted on the sliding bars at all times, but the spring tension is such that the files may be readily spread apart for removal or examination of the contents. This structure has proven very satisfactory where the filing drawer is kept substantially full, but it requires the use of intermediate follower plates when only partially filled.

The object of the present invention is to generally improve and simplify the construction and operation of filing drawers of the character described; and particularly to provide a compressor plate which is adjustable with relation to the sliding bars and the bottom of the drawer so that it may assume any desired position intermediate the ends of the drawer to maintain the files in an upright partially compressed position whether the drawer is partially or completely filled with files.

The invention is shown by way of illustration in the accompanying drawings in which Fig. 1 is a perspective view of a filing cabinet drawer, said view being partially broken away and said view also showing the compressor plate;

Figure 1:
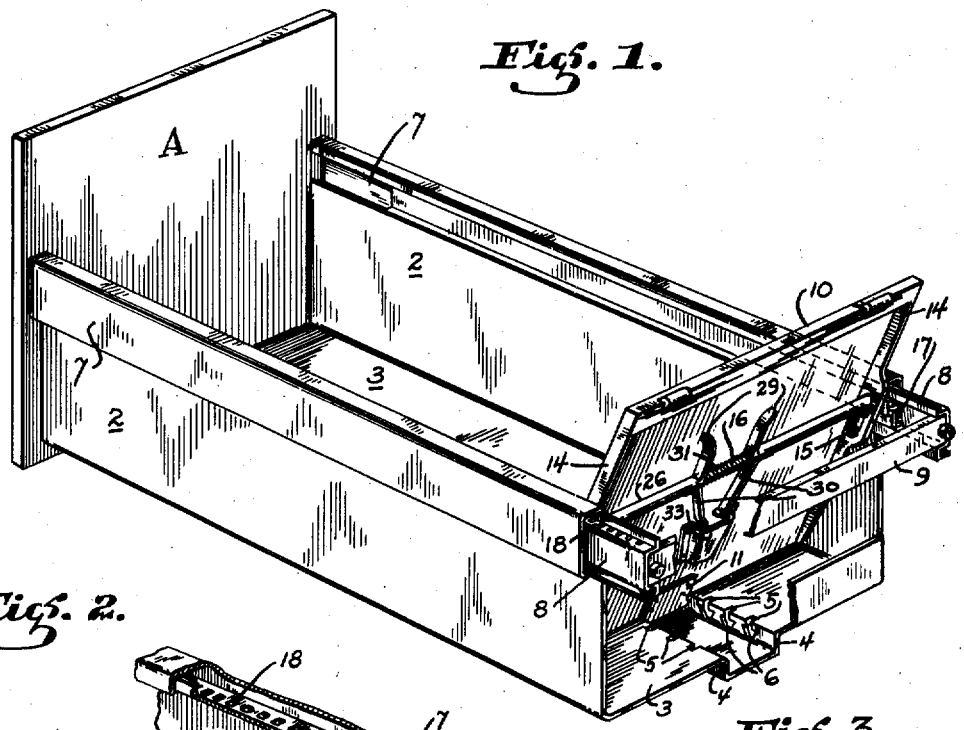
Figure 2:
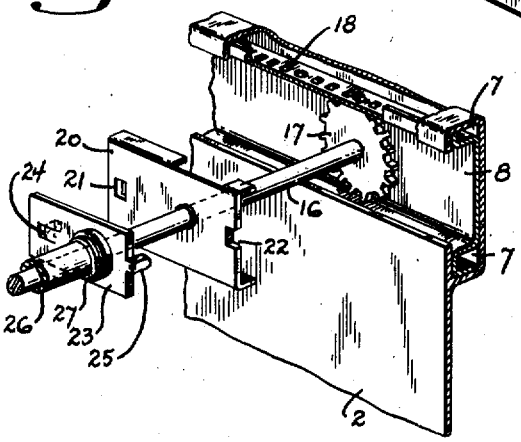
Fig. 2 is a detail perspective view showing a portion of one of the sliding bars in the drawer, the rack bar, the gear engaging same, the cross shaft, the gear housing plate, and the clutching plate, said view showing the housing and clutching plate moved away from the gear so that their construction can be seen.
Figure 3:
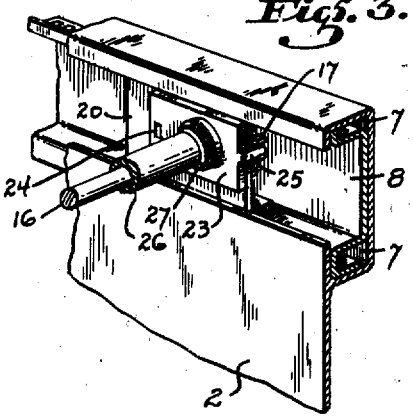
Fig. 3 is a view similar to Fig. 2 showing the several parts referred to in Fig. 2 in their assembled position.
Figure 4:
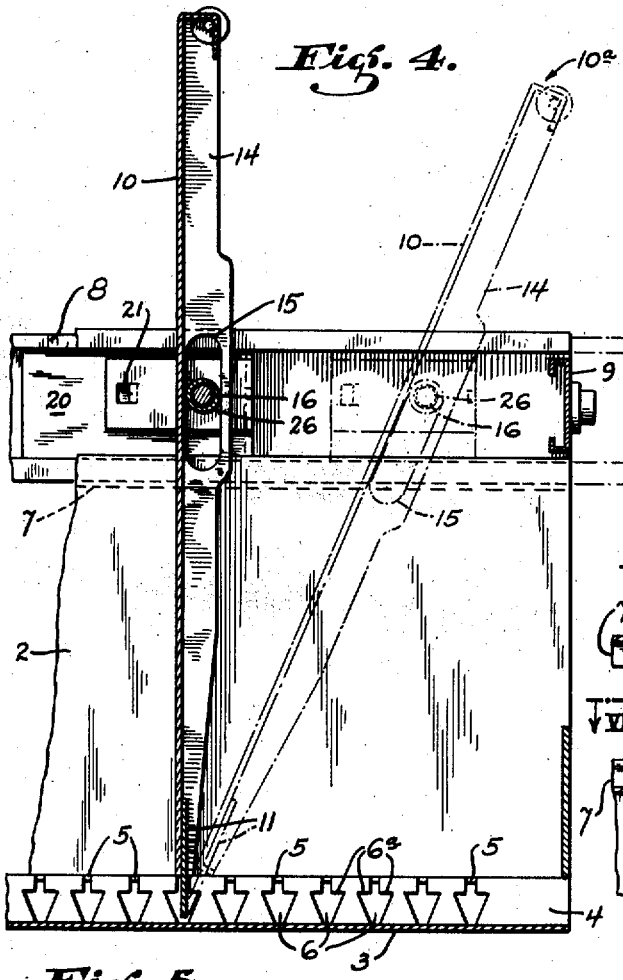
Fig. 4 is a vertical section of a portion of the drawer and the compression plate, said section being taken on line IV—IV of Fig. 5.
Figure 8:
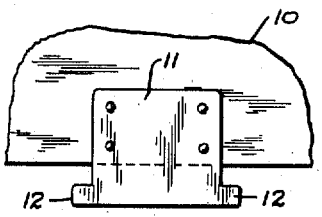
Fig. 8 is a detail view of the lower edge of the compressor plate, said view showing only a portion of the compressor plate.
Figure 6:
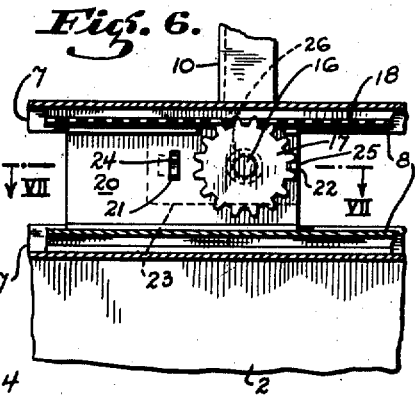
Fig. 6 is a longitudinal section taken on line VI—VI of Fig. 5.
Figure 5:
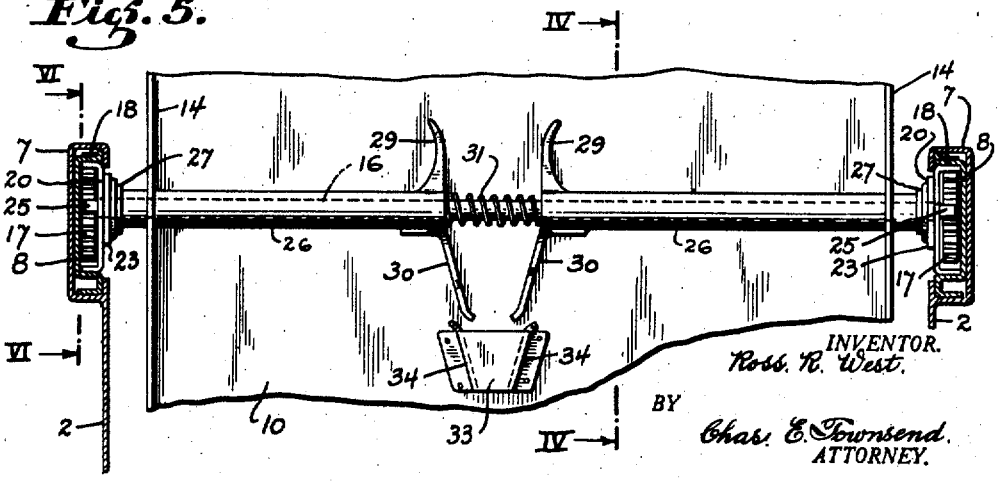
Fig. 5 is an end view looking from the rear side of the compression plate, said view showing only a portion of the compression plate and said view also showing the sides of the drawer, the channels formed at the upper edges of the sides, and also showing the sliding bars and the mechanism carried thereby.

Referring to the drawings in detail, and particularly to Figs. 2 and 4, A indicates the front panel of a filing drawer, 2—2 the sides, and 3 the bottom thereof. In the bottom proper and extending centrally and longitudinally is a depressed channel with side walls 4—4 in which are formed uniformly spaced slots 5 terminating in enlarged V-shaped notched ends as indicated at 6. The purpose of notches and slots will hereinafter appear.

The upper side edges of the drawer are channeled as indicated at 7—7, and these channels form guideways for a pair of sliding bars 8—8 which are connected at the rear ends by a cross-bar 9. Disposed within the drawer is a compressor plate or follower board 10 on the lower edge of which is welded or secured a plate 11 having a pair of side lugs 12—12. The plate 11 has a width slightly less than the depressed channel and normally extends downwardly into the same. By swinging the plate 10 to a vertical position, the side lugs 12—12 will register with the slots 5—5, thereby permitting the plate to be lifted upwardly and out of the depressed channel, and it may then be moved to any position intermediate the ends of the drawer and may again be reinserted in the depressed channel by registering the lugs 12—12 with the slots 5—5. When reinserted, a pivotal connection is formed between the compressor plate and the bottom of the drawer, as the compression plate is free to pivot on the lugs 12—12 which rest in the V-shaped notches 6. The plate is at the same time secured against removal by the shoulders 6a except when a vertical position is assumed, and it is then removable only by intent, as manual force is required to lift and disengage the plate. The compressor plate is actuated by the sliding bars 8—8 and is adjustable with relation to the same.

Figure 7:
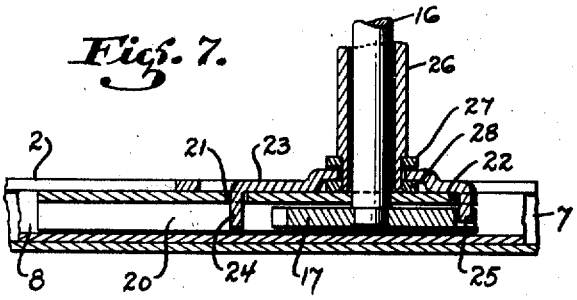
Fig. 7 is an enlarged plan section taken on line VII—VII of Fig. 6.

This is accomplished as follows:

Formed at each end of the compressor plate and extending rearwardly from the same is a flange 14, and formed in each flange is an elongated slot 15 through which extends a shaft 16. Secured on each end of the shaft is a gear 17 and formed in each sliding bar is a rack bar 18 with which each gear meshes. The slots 15 permit the compressor plate to be lifted out of the slots 5—5 formed in the depressed channel or, in other words, to be disengaged therefrom, and when so disengaged, the plate may be moved longitudinally of the drawer, as the gears 17—17 are free to ride back and forth in the sliding bars 8—8, but inasmuch as the sliding bars in which the rack bars are formed are depended upon to actuate the compressor plate 10, means must be provided for locking the gears against rotation, as a fixed relationship between shaft 16 and the sliding bars must be maintained when actuation of the compressor plate is desired. This is accomplished as follows:

Slidably mounted in each sliding bar is a gear housing plate 20. Formed in one end of each plate 20 is an opening 21 and in the opposite end a notch 22. Cooperating with each housing plate is a clutching plate 23 and formed on each plate 23 are two lugs 24 and 25. The lugs 24 extend through the openings 21 of the housing plates, while the lugs 25 extend through the notches 22, and under normal conditions lugs 25 also extend between the teeth of the gears 17 so as to lock or dog the gears and shaft 16 against rotation with relation to the gear racks 18, thereby retaining shaft 16 and the compressor plate 10 in a fixed position with relation to the sliding bars. Means are, however, provided for disengaging or withdrawing the lugs 25 from between the teeth of the respective gears 17 when adjustment between the compressor plate and the sliding bars is desired, and this is accomplished as follows:

Mounted on shaft 16 are two tubular sleeves 26, the outer ends of which extend through the clutching plates 23. A swivel connection is made between each sleeve and adjacent clutching plate as shown in Fig. 7, by means of two collars 27 and 28 secured to the sleeve, such a connection being essential to permit partial rotation of the sleeves about shaft 16 as will hereinafter appear. On the inner end of each sleeve 26 and extending upwardly therefrom is a finger grip 29, and extending downwardly from each sleeve is a similar member in the form of an angularly disposed arm 30, and between the sleeves is mounted a compression spring 31. This spring normally forces the sleeves 26 outwardly on shaft 16 and thereby maintains the clutching plates in clutching position. On the other hand, if it is desired to disengage the clutching plates, or, in other words, to retract the lugs 25 from between the teeth of the gears 17 when adjustment of the compression plate is desired, it can be accomplished in two ways:

First, by grasping the compression plate by its upper edge and swinging it to a vertical position and then lifting it upwardly and vertically, lugs 12—12 are free to clear and pass up through the slots 5—5. At the same time the inclined arms 30 will be engaged by a member 33 having oppositely inclined cam faces 34—34 and these arms will thus be forced together, thereby pulling the sleeves 26 together and, as they are connected with the respective clutching plates 23, the lugs 25 will be withdrawn from between the teeth of the gears 17 and the compressor plate is free to be moved longitudinally of the drawer to any position desired. Then it is pushed downwardly to cause the lugs 12—12 to enter the slots 5—5 and at the same time to release the arms 30, and when these are released spring 31 will force the sleeves and clutching plates outwardly and the gears will be locked with relation to the rack bars and the sliding bars in which the rack bars are formed.

The second way in which the same operation may be accomplished is to grasp the compression plate with one hand and swing it to vertical position and lift it, then to grasp the finger bars 29 with the fingers of the other hand and press them together to cause release of the clutching plates.

The first method of adjusting the compression plate is obviously the more desirable, as it requires the use of one hand only. In actual practice the drawer may be partially or wholly filled with files, and if the compressor plate is properly adjusted the files will stand in a vertical position and will be partially compressed when the drawer is closed, as compression of the files is obtained by forcing the cross-bar 9 which connects the inner ends of the sliding bars against the inside frame or back of the cabinet, when the drawer is pushed inwardly into closed position; but when the drawer is open the sliding bars will assume the dotted line position shown at 7*a* in Fig. 4, and the compressor plate the dotted line position indicated at 10*a*. In this position compression on the files is relieved and they are freely accessible for opening, removal or otherwise. On the other hand, when the drawer is closed or pushed rearwardly into the cabinet, bar 9 strikes the inside frame of the cabinet, causing the sliding bars to move back into the channeled tracks 7 of the drawer. At the same time the compressor plate swings about the lugs 12—12 as a pivot from the dotted line position 10*a* to the vertical full line position, thereby straightening up the files and placing them under compression again. The sliding bars may be spring actuated as disclosed in my co-pending application heretofore referred to, in which case the compressor plate will tend to assume a vertical position at all times.

Be that as it may, the structure here disclosed provides a pivotal support for the bottom or lower edge of the compressor plate at any point between the front and rear end of the drawer, and it provides an adjustable connection between the sliding bars and the compressor plate whereby it is actuated regardless of its position intermediate the ends of the drawer.

It was previously stated that the sleeves must be free to partially rotate about shaft 16, and for that reason the collar connection between the sleeves and the clutching plates was provided as shown in Fig. 7. This is due to the fact that the compressor plate has a swinging movement from the dotted to the vertical position shown in Fig. 4. In so swinging the sleeves are partially rotated about shaft 16 as the finger grips and the angularly disposed arms are in substantial contact with the rear surface of the compressor plate. Hence if the sleeves were secured to the clutching plates, rotation of the sleeves could not take place nor could the compressor plate tilt, but by providing the swivel or collar connection, partial rotation is permitted and the compressor plate is free to swing or tilt.

While this and other features of my invention have been more or less specifically described for purposes of illustration, I wish it understood that modifications may be resorted to within the scope of the appended claims.

Having thus described and illustrated my invention, what I claim and desire to secure by Letters Patent is:

1. In a filing cabinet drawer a compression plate, a pair of sliding bars mounted one in each side of the drawer and adapted during sliding movement to project beyond the rear end of the drawer, a cross shaft connecting the sliding bars, a connection between said shaft and the compression plate whereby a tilting movement is transmitted to the compression plate during sliding movement of the bars, means for adjusting the shaft longitudinally of the sliding bars to permit the compression plate to assume any position intermediate the ends of the drawer, and means for forming a pivotal connection between the lower edge of the compression plate and the bottom of the drawer in any position of the compression plate intermediate the ends of the drawer.

2. In a filing cabinet drawer a compression plate, a pair of sliding bars mounted one in each side of the drawer and adapted during sliding movement to project beyond the rear end of the drawer, a cross shaft connecting the sliding bars, a connection between said shaft and the compression plate whereby a tilting movement is transmitted to the compression plate during sliding movement of the bars, means for adjusting the shaft longitudinally of the sliding bars to permit the compression plate to assume any position intermediate the ends of the drawer, means for securing the shaft against movement with relation to the sliding bars when adjusted, and means for forming a pivotal connection between the lower edge of the compression plate and the bottom of the drawer in any position of the compression plate intermediate the ends of the drawer.

3. In a filing cabinet drawer a compression plate, a pair of sliding bars mounted one in each side of the drawer and adapted during sliding movement to project beyond the rear end of the drawer, a cross shaft connecting the sliding bars, a connection between said shaft and the compression plate whereby a tilting movement is transmitted to the compression plate during sliding movement of the bars, means for adjusting the shaft longitudinally of the sliding bars to permit the compression plate to assume any position intermediate the ends of the drawer, a pivotal connection between the lower edge of the compression plate and the bottom of the drawer, and means for adjusting said connection to assume any position intermediate the ends of the drawer.

4. In a filing cabinet drawer a compression plate, a pair of sliding bars mounted one at each side of the drawer and adapted during sliding movement to project beyond the rear end of the drawer, a cross shaft connecting the sliding bars, a connection between said shaft and the compression plate whereby a tilting movement is transmitted to the compression plate during sliding movement of the bars, means for adjusting the shaft longitudinally of the sliding bars to permit the compression plate to assume any position intermediate the ends of the drawer, a pair of lugs at the lower edge of the compressor plate and forming a pivotal support therefor, and a plurality of depressions formed longitudinally of the drawer to receive the lugs in any position of the compression plate intermediate the ends of the drawer.

5. In a filing cabinet drawer a compression plate, a pair of sliding bars mounted one at each side of the drawer and adapted during sliding movement to project beyond the rear end of the drawer, a cross shaft connecting the sliding bars, a gear on each end of the shaft, a gear rack on each sliding bar with which the corresponding gear intermeshes, means for locking the gears against rotation with relation to the gear racks to secure the shaft with relation to the sliding bars, other means for releasing the gears to permit adjustment of the shaft longitudinally of the drawer and the sliding bars, a connection between the shaft and the compression plate whereby a tilting movement is transmitted to the compression plate during sliding movement of the bars, and an adjustable pivotal connection between the lower edge of the compression plate and the bottom of the drawer, whereby the compression plate may be moved longitudinally of the drawer when the position of the shaft is adjusted longitudinally of the sliding bars.

6. In a filing cabinet drawer a compression plate, a pair of sliding bars mounted one at each side of the drawer and adapted during sliding movement to project beyond the rear end of the drawer, a cross shaft connecting the sliding bars, a gear on each end of the shaft, a gear rack on each sliding bar with which the corresponding gear intermeshes, a clutching plate at each end of the cross shaft, a lug on each plate and normally projecting inwardly between the teeth of the gears to clutch the gears against rotation with relation to the rack bars, a spring normally maintaining the plates and lugs in clutching position, other means for disengaging the lugs with the teeth of the gears to permit adjustment of the shaft longitudinally of the drawer and sliding bars, a connection between the shaft and the compression plate whereby a tilting movement is transmitted to the compression plate during sliding movement of the bars, and an adjustable pivotal connection between the lower edge of the compression plate and the bottom of the drawer, whereby the compression plate may be moved longitudinally of the drawer when the position of the shaft is adjusted longitudinally of the sliding bars.

7. In a filing cabinet drawer a compression plate, a pair of sliding bars mounted one at each side of the drawer and adapted during sliding movement to project beyond the rear end of the drawer, a cross shaft connecting the sliding bars, a gear on each end of the shaft, a gear rack on each sliding bar with which the corresponding gear intermeshes, a clutching plate at each end of the cross shaft, a lug on each plate and normally projecting inwardly between the teeth of the gears to clutch the gears against rotation with relation to the rack bars, a spring normally maintaining the plates and lugs in clutching position, a connection between the shaft and the compression plate whereby tilting movement is transmitted to the compression plate during sliding movement of the bars, a pivotal connection between the lower edge of the compressor and the bottom of the drawer, said pivotal connection being adjustable longitudinally of the drawer, and said pivotal connection being disengaged by swinging the compressor plate to a vertical position and lifting it away from the bottom, and means actuated by the vertical lifting movement of the compression plate for simultaneously releasing the clutching plates to permit the compression plate to be moved longitudinally of the drawer and with relation to the sliding bars.

8. In a filing cabinet drawer, a pair of sliding bars mounted one at each side of the drawer, and adapted during sliding movement to project beyond the rear end of the drawer, a compression plate mounted in the drawer, a pivotal connection between the upper portion of the compression plate and the sliding bars, said pivotal connection being longitudinally adjustable with relation to the bars, and a longitudinally adjustable pivotal connection between the lower edge of the compression plate and the bottom of the drawer.

9. In a filing cabinet drawer, a pair of sliding bars mounted one on each side of the drawer, a compression plate mounted in the drawer, a pivotal connection between the upper portion of the compression plate and the sliding bars, said pivotal connections being longitudinally adjustable with relation to the bars, said compression plate having a longitudinally adjustable pivotal connection between its lower edge and the bottom of the drawer and lying within the plane of the bottom of the drawer.

ROSS R. WEST.